(12) United States Patent
Hashimoto

(10) Patent No.: US 10,317,268 B2
(45) Date of Patent: Jun. 11, 2019

(54) LIQUID LEVEL DETECTION DEVICE

(71) Applicant: DENSO CORPORATION, Kariya, Aichi-pref. (JP)

(72) Inventor: Hiroshi Hashimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 15/524,646

(22) PCT Filed: Nov. 23, 2015

(86) PCT No.: PCT/JP2015/005816
§ 371 (c)(1),
(2) Date: May 5, 2017

(87) PCT Pub. No.: WO2016/088325
PCT Pub. Date: Jun. 9, 2016

(65) Prior Publication Data
US 2017/0322065 A1 Nov. 9, 2017

(30) Foreign Application Priority Data

Dec. 4, 2014 (JP) ................................. 2014-246211

(51) Int. Cl.
*G01F 23/36* (2006.01)
*G01F 23/38* (2006.01)

(52) U.S. Cl.
CPC .............. *G01F 23/36* (2013.01); *G01F 23/38* (2013.01)

(58) Field of Classification Search
CPC .......... G01F 23/30; G01F 23/32; G01F 23/34; G01F 23/36; G01F 23/38

USPC ........................................... 73/305, 314, 317
See application file for complete search history.

(56) References Cited

U.S. PATENT DOCUMENTS

2015/0355013 A1* 12/2015 Sato ...................... G01F 23/363
73/317
2016/0047686 A1* 2/2016 Terada .................... G01F 23/38
73/317
2017/0322066 A1* 11/2017 Hashimoto ............. G01F 23/38

FOREIGN PATENT DOCUMENTS

| JP | H09152369 A | 6/1997 |
|---|---|---|
| JP | 2006226843 A | 8/2006 |
| JP | 2009058248 A | 3/2009 |
| JP | 2012225897 A | 11/2012 |
| JP | 2013190373 A | 9/2013 |

(Continued)

*Primary Examiner* — Benjamin R Schmitt
(74) *Attorney, Agent, or Firm* — Harness, Dickey & Pierce, P.L.C.

(57) ABSTRACT

A liquid level detection device is provided with a fixed body and a rotating body, having a float and an arm. The arm has an insertion portion inserted into the rotating body and an extending portion extending straight and bent relative to the insertion portion. The rotating body has an insertion hole in which the insertion portion of the arm is inserted, a holding portion having a receiving opening receiving the extending portion and holding the extending portion received by the receiving opening, a stopper having an end face and releasing the receiving opening from a blocking state in which the end face blocks the receiving opening, and a protruding wall disposed on an opposite side to the holding portion with the stopper in between and protruding in the opposite direction beyond the end face in the blocking state.

4 Claims, 4 Drawing Sheets

(56) References Cited

FOREIGN PATENT DOCUMENTS

JP    2014139517 A    7/2014

* cited by examiner

LIQUID LEVEL DETECTION DEVICE

CROSS REFERENCE TO RELATED APPLICATIONS

This application is a U.S. National Phase Application under 35 U.S.C. 371 of International Application No. PCT/JP2015/005816 filed on Nov. 23, 2015 and published in Japanese as WO 2016/088325 A1 on Jun. 9, 2016. This application is based on and claims the benefit of priority from Japanese Patent Application No. 2014-246211 filed on Dec. 4, 2014. The entire disclosures of all of the above applications are incorporated herein by reference.

TECHNICAL FIELD

The present disclosure relates to a liquid level detection device detecting a liquid level of a liquid stored in a container.

BACKGROUND ART

A liquid level detection device in the related art which detects a liquid level of a liquid stored in a container using a relative angle of a rotating body relative to a fixed body is known. A liquid level detection device disclosed in Patent Literature 1 includes a fixed body fixed to a container, a rotating body rotating relative to the fixed body, a float floating in a liquid, and an arm connecting the rotating body and the float and allowing the rotating body to rotate with up and down motions of the float. The arm is formed by bending a tip end which is to be inserted into the rotating body. The rotating body includes an insertion hole in which the tip end of the arm is inserted in an insertion direction, a holding portion provided with a receiving opening which receives the arm in an intersecting direction intersecting with the insertion direction and holds the received arm, and a hook. The hook includes an L-shaped portion preventing the arm from coming off the receiving opening.

PRIOR ART LITERATURES

Patent Literature

Patent Literature 1: JP2006-226843A

SUMMARY OF INVENTION

According to the device disclosed in Patent Literature 1, however, the hook undergoes elastic deformation not only in the insertion direction but also in another direction when the arm is mounted and the L-shaped portion has to be hooked to the arm after elastic deformation. Hence, an arm holding strength is increased whereas ease of mounting is decreased.

An object of the present disclosure is to provide a liquid level detection device which makes an arm easy to mount and has a higher arm holding strength at a same time.

According to an aspect of the present disclosure, the liquid level detection device is provided with a fixed body fixed to a container and a rotating body rotating relative to the fixed body, and detects a liquid level of a liquid stored in the container using a relative angle of the rotating body relative to the fixed body. The liquid level detection device includes a float floating in the liquid and an arm connecting the rotating body and the float and allowing the rotating body to rotate with up and down motions of the float. The arm has an insertion portion to be inserted into the rotating body and an extending portion extending straight and bent relative to the insertion portion. The rotating body has an insertion hole in which the insertion portion of the arm is inserted in an insertion direction, a holding portion having a receiving opening receiving the extending portion in an intersecting direction intersecting with the insertion direction and holding the extending portion received by the receiving opening, a stopper having an end face facing an opposite direction to the insertion direction and releasing the receiving opening by moving in the insertion direction due to elastic deformation from a blocking state in which the end face blocks the receiving opening, and a protruding wall disposed on an opposite side to the holding portion with the stopper in between and protruding in the opposite direction beyond the end face in the blocking state.

According to the liquid level detection device, when the arm is inserted into the insertion hole in the insertion direction to mount the arm, the extending portion is moved in the insertion direction and disposed between the holding portion and the protruding wall to be pressed against the end face of the stopper. The receiving opening is released by allowing the stopper to undergo elastic deformation in the insertion direction in the manner as above, and the arm can be readily mounted by rotating the extending portion toward the receiving opening about the insertion hole as the shaft. Eventually, the stopper elastically restores to the blocking state and blocks the receiving opening.

In a case where the extending portion nearly comes off the holding portion due to various factors, such as an external force, the stopper blocking the receiving opening prevents the extending portion from coming off. When a large force is applied to the stopper from the extending portion, the stopper deforms to an opposite side to the receiving opening. However, because the protruding wall provided on the opposite side to the holding portion protrudes in the opposite direction to the insertion direction beyond the end face in the blocking state, the stopper is prevented from surmounting the protruding wall and the protruding wall receives the stopper. Hence, the extending portion can be held intact. According to the configuration as above, the liquid level detection device which makes the arm easy to mount and has a higher arm holding strength at a same time can be provided.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, an embodiment of the present disclosure will be described according to the drawings.

Figure 1:
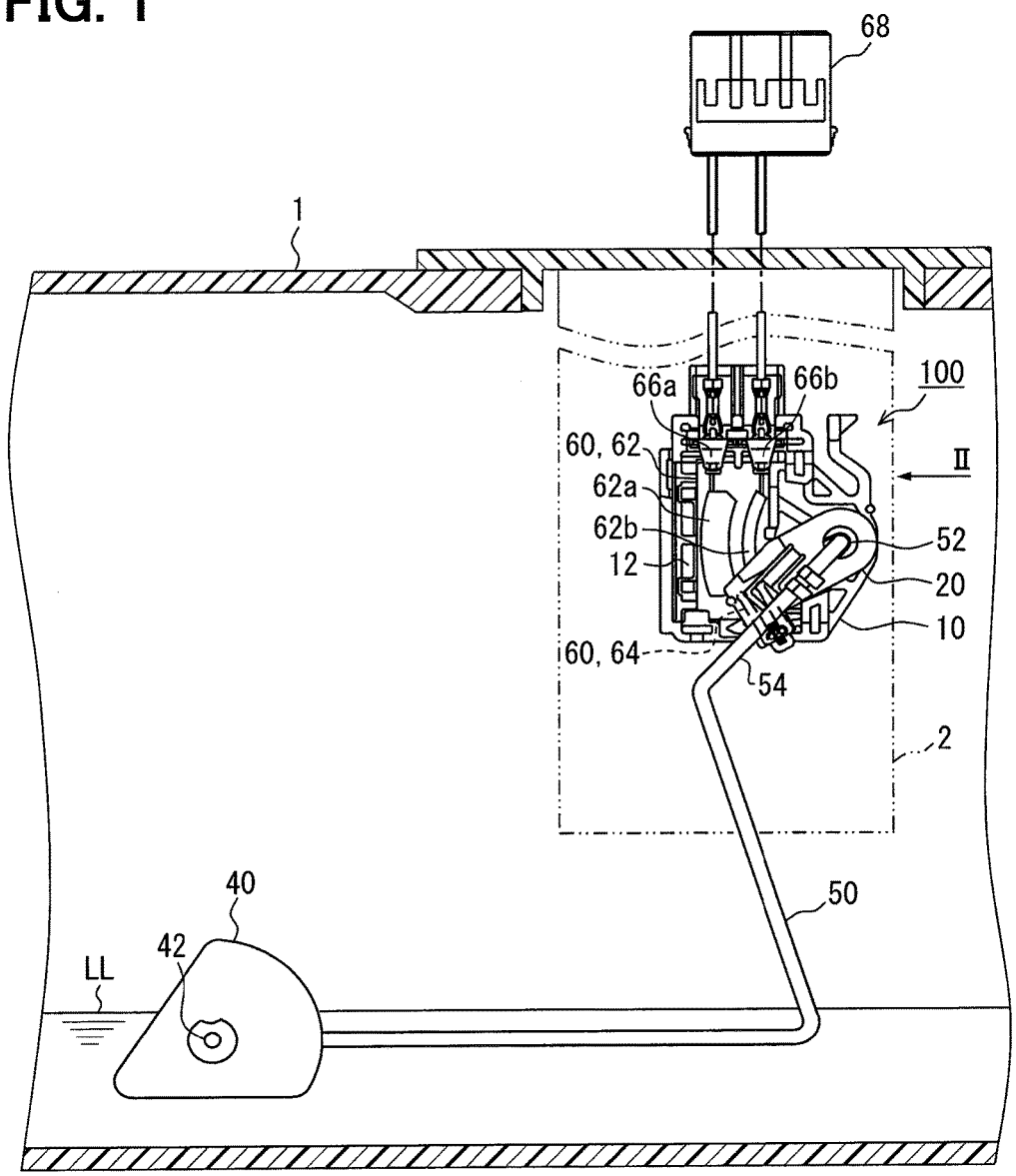
FIG. 1 is front view of a liquid level detection device according to an embodiment of the present disclosure.

As is shown in FIG. 1, a liquid level detection device 100 according to the embodiment of the present disclosure is set inside a fuel tank 1 of a vehicle as a container in which to store fuel as a liquid and held by a fuel pump module 2 or the like. The liquid level detection device 100 includes a housing 10 as a fixed body fixed to the fuel tank 1, an insulator 20 as a rotating body rotating relative to the housing 10, a float 40, an arm 50, a circuit board 62, and a sliding plate 64. The liquid level detection device 100 detects a liquid level LL of the fuel stored in the fuel tank 1 using a relative angle of the insulator 20 relative to the housing 10 detected by a variable resistor 60 chiefly formed of the circuit board 62 and the sliding plate 64 and functioning as a detection mechanism.

Figure 2:
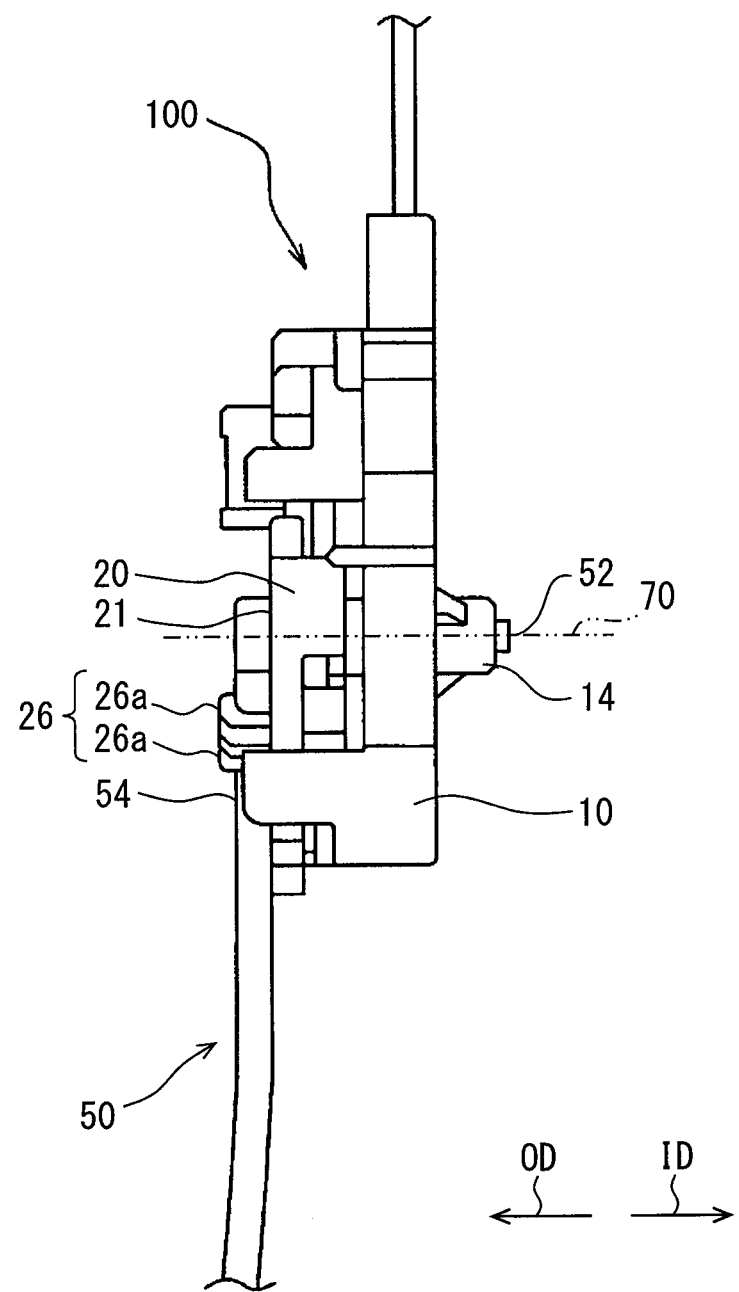
FIG. 2 is a side view of the liquid level detection device when viewed in a direction II of FIG. 1.

The housing 10 is made of synthetic resin, for example, polyacetal (POM) resin, and as are shown in FIGS. 1 and 2, fixed to the fuel tank 1 via the fuel pump module 2. The circuit board 62 and a plus terminal 66a and a minus terminal 66b connected to the circuit board 62 are attached to the housing 10. The housing 10 is shaped like a container having a bottom wall and a side wall and forms a board storing portion 12 in which to store the circuit board 62. The housing 10 is also provided with a boss portion 14 through which to pass the arm 50.

The insulator 20 is made of synthetic resin, for example, POM resin, and as are shown in FIGS. 1 to 5, supported on the housing 10 in a rotatable manner. The sliding plate 64 is attached to the insulator 20 and also the arm 50 is mounted to the insulator 20.

The float 40 is made of a material having a lower specific gravity than fuel, for example, foamed ebonite, and as is shown in FIG. 1, floats on a liquid surface of the fuel. That is to say, the float 40 moves up and down with a change of the liquid level LL. The float 40 is held by the insulator 20 via the arm 50.

The arm 50 is formed of a core shaped like a round bar and having metal, such as stainless steel, and connects the float 40 and the insulator 20. A first end of the arm 50 is inserted into a through-hole 42 provided to the float 40. A second end of the arm 50 is held by the insulator 20 using a holding mechanism 22 of the insulator 20. More specifically, on the second end, the arm 50 has an insertion portion 52 to be inserted into the insulator 20 and an extending portion 54 extending straight and bent relative to the insertion portion 52.

In the present embodiment, the second end of the arm 50 is shaped like a capital L by bending the extending portion 54 by substantially 90 degrees relative to the insertion portion 52. Also, as is shown in FIG. 2, after a tip end of the insertion portion 52 is passed through the insulator 20, the tip end is inserted into the boss portion 14 of the housing 10 and forms a rotation shaft 70 of the insulator 20.

According to the configuration as above, the arm 50 rotates the insulator 20 with up and down motions of the float 40.

As is shown in FIG. 1, the circuit board 62 made of ceramics or the like is shaped like a plate and held by the housing 10 while being stored in the board storing portion 12. A set of resistive element patterns 62a and 62b as a detection circuit is provided to the circuit board 62 on a surface on a side of the insulator 20. Each of the resistive element patterns 62a and 62b is shaped like an arc about the rotation shaft 70. The resistive element pattern 62a on an outer peripheral side is formed by aligning multiple resistive elements having a predetermined electrical resistance value. The resistive element pattern 62a is an electrode pattern forming a plus pole and electrically connected to the plus terminal 66a. The resistive element pattern 62b on an inner peripheral side is an electrode pattern forming a minus pole and electrically connected to the minus terminal 66b. Accordingly, ground potential is applied to the resistive element pattern 62b via a connector 68.

Figure 4:
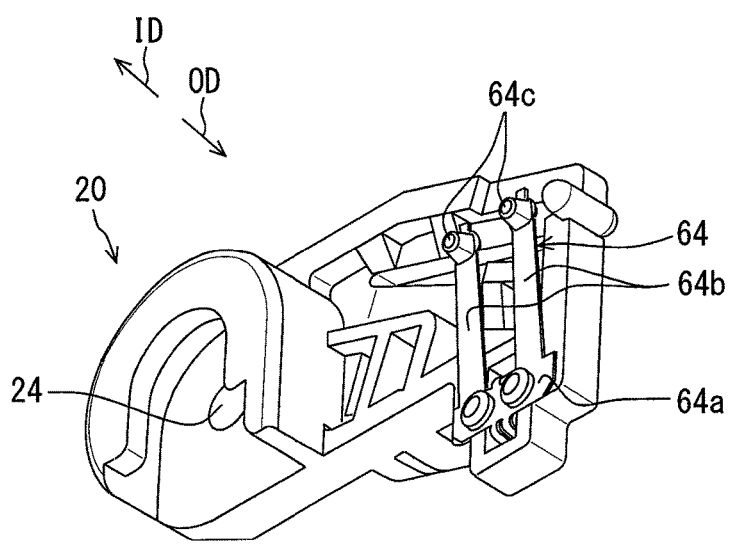
FIG. 4 is a perspective view of the insulator and a sliding plate of the embodiment.

As is shown in FIG. 4, the sliding plate 64 is a plate-like conductive member made of metal, and attached to the insulator 20 on a side opposing the circuit board 62. The sliding plate 64 is shaped like a capital U as a whole and has a coupling portion 64a, a pair of flexible portions 64b extending from both ends of the coupling portion 64a, and a pair of sliding contact points 64c provided to tip ends of the flexible portions 64b. By attaching the coupling portion 64a to the insulator 20, the sliding plate 64 is allowed to rotate with the insulator 20 as one unit. The flexible portions 64b are capable of being bent in a plate thickness direction of the circuit board 62. The sliding contact points 64c are pressed against the resistive element patterns 62a and 62b due to elasticity of the flexible portions 64b, respectively.

The circuit board 62 and the sliding plate 64 together form the variable resistor 60 functioning as the detection mechanism. An electrical resistance value of the detection circuit varies with a relative angle of the insulator 20 relative to the housing 10. More specifically, when the insulator 20 rotates, the sliding plate 64 undergoes relative displacement relative to the circuit board 62 while the sliding contact points 64c are in contact with the resistive element patterns 62a and 62b, respectively. Consequently, the sliding contact points 64c slide on the resistive element patterns 62a and 62b, respectively. The electrical resistance value of the detection circuit decreases to a minimum when the sliding contact points 64c are in closest proximity to the terminals 66a and 66b, respectively. The electrical resistance value of the detection circuit increases gradually while the sliding contact points 64c in closest proximity to the terminals 66a and 66b move away from the terminals 66a and 66b in association with a rotation of the insulator 20. According to the principle as above, the variable resistor 60 is capable of detecting a relative angle. An outside device (for example, a combination meter) connected to the variable resistor 60 becomes capable of obtaining a potential difference between the terminals 66a and 66b corresponding to the electrical resistance value of the detection circuit as detection information of the liquid level LL.

Figure 3:
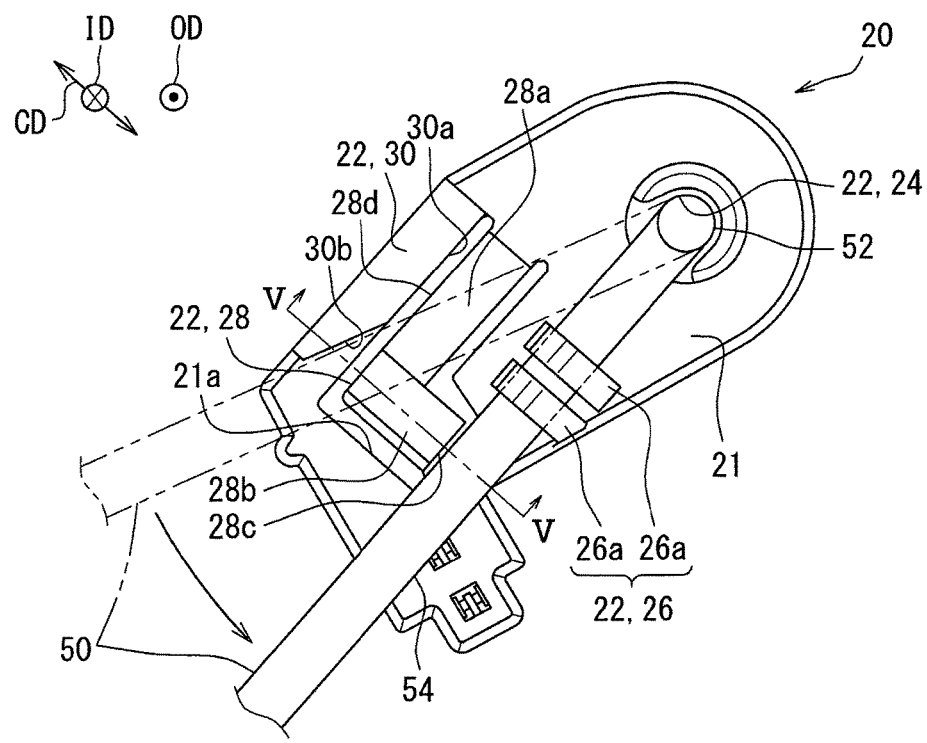
FIG. 3 is a front view of an insulator and an arm of the embodiment.
Figure 5:
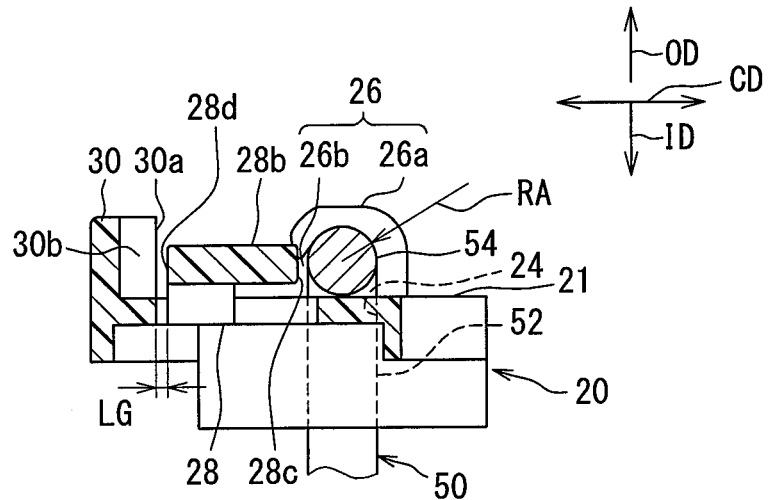
FIG. 5 is a schematic view of a cross section taken along the line V-V of FIG. 3.

The arm 50 held by the insulator 20 will now be described in detail. As are shown in FIGS. 3 and 5, the insulator 20 has an insertion hole 24, a holding portion 26, a stopper 28, and a protruding wall 30 as members instituting the holding mechanism 22.

The insertion hole 24 is a cylindrical hole in which the insertion portion 52 of the arm 50 is inserted in an insertion direction ID. In the present embodiment in which the insertion portion 52 functions also as the rotation shaft 70, the insertion hole 24 is provided so as to penetrate through the insulator 20 and lies next to the boss portion 14 of the housing 10 (see also FIG. 2). A diameter of the insertion hole 24 is slightly larger than a diameter of the insertion portion 52. The insertion hole 24 is provided substantially perpendicular to an outer surface 21 which is a surface of the insulator 20 facing an opposite side to a side where the sliding plate 64 is attached (in other words, an opposite direction OD to the insertion direction ID).

The holding portion 26 includes two holding claws 26a provided side by side along a radial direction of the insertion hole 24 on the outer surface 21. Each of the holding claws 26a protrudes from the outer surface 21 and forms a claw shape bent in an arc. Each of the holding claws 26a opposes the outer surface 21 at a tip end and therefore has a receiving opening 26b which receives the extending portion 54 of the arm 50 in an intersecting direction CD intersecting with the insertion direction ID. In the present embodiment, in particular, the receiving opening 26b is provided in the intersecting direction CD, which is a direction substantially intersecting with the insertion direction ID and running along the outer surface 21.

A minor diameter of each of the holding claws 26a is slightly smaller than a diameter of the extending portion 54. Accordingly, each of the holding claws 26a of the holding portion 26 in an elastically deformed state holds the extending portion 54 received by the receiving opening 26b by sticking to the extending portion 54. The holding portion 26 may include one or three or more holding claws 26a. Alternatively, a similar structure other than claws may be used instead.

The stopper 28 is disposed so as to overlap a hole portion 21a provided next to the receiving opening 26b in the insulator 20. The stopper 28 is formed to protrude from the outer surface 21 of the insulator 20 in an L-shape toward the extending portion 54 along a circumferential direction of the insertion hole 24. The stopper 28 releases the receiving opening 26b by moving in the insertion direction ID when a blocking portion 28c of the stopper 28 undergoes elastic deformation from a blocking state in which the blocking portion 28c blocks the receiving opening 26b. When the liquid level detection device 100 to be used in the fuel tank 1 is set in the fuel tank 1 as shown in FIG. 1, the stopper 28 is in the blocking state, that is, not in an elastically deformed state.

The stopper 28 also has an inclined portion 28a and an end face 28b. The inclined portion 28a connects to the outer surface 21 and extends substantially parallel to the extending portion 54 held by the holding portion 26. In the blocking state, the inclined portion 28a forms an inclined surface protruding in the opposite direction OD more on a tip end. The end face 28b is provided closer to the tip end than the inclined portion 28a and shaped like a plane extending toward the extending portion 54 and facing the opposite direction OD to the insertion direction ID.

Further, the blocking portion 28c is provided at a tip end of the stopper 28. The blocking portion 28c in the blocking state is shaped like a plane opposing the extending portion 54 at a point displaced from the holding portion 26 in the radial direction of the insertion hole 24. In the present embodiment, in particular, the blocking portion 28c in the blocking state opposes the extending portion 54 with a slight clearance in between at a point on an outer peripheral side from the holding portion 26 in the radial direction of the insertion hole 24.

As is shown in FIG. 3, the protruding wall 30 is disposed next to the hole portion 21a on an opposite side to the holding portion 26 with the stopper 28 in between. As is shown in FIG. 5, the protruding wall 30 protrudes in the opposite direction OD beyond the outer surface 21. Further, the protruding wall 30 protrudes in the opposite direction OD beyond the end face 28b of the stopper 28 in the blocking state.

The protruding wall 30 has an opposing wall surface 30a and an inclined wall surface 30b. The opposing wall surface 30a is a planar surface disposed oppositely to an opposing surface 28d which is a surface of the stopper 28 on a side nearest to the protruding wall 30. A clearance is formed between the stopper 28 and the protruding wall 30 by the opposing wall surface 30a and the opposing surface 28d provided in the manner as above. In the present embodiment, in particular, a dimension LG of the clearance between the stopper 28 and the protruding wall 30 is set to be equal to or less than a radius RA of the extending portion 54.

As is shown in FIG. 3, the inclined wall surface 30b is provided at a point more distant from the insertion hole 24 than the opposing wall surface 30a and inclines relative to the opposing wall surface 30a. More specifically, the inclined wall surface 30b inclines to become more distant from the extending portion 54 received by the receiving opening 26b with an increasing distance from the insertion hole 24.

For example, when the liquid level detection device 100 in which the extending portion 54 is held by the holding portion 26 is set in the fuel tank 1 or in use, the extending portion 54 nearly comes off the holding portion 26 in some cases. In such cases, the extending portion 54 hits the blocking portion 28c of the stopper 28 and is pushed back to the holding portion 26. Meanwhile, the stopper 28 is pushed toward the protruding wall 30 due to a force received from the extending portion 54. However, even when the stopper 28 moves toward the protruding wall 30, because the opposing surface 28d is in contact with the opposing wall surface 30a, the stopper 28 is regulated not to move over a distance equal to the dimension LG of the clearance between the stopper 28 and the protruding wall 30. The stopper 28 moves more readily toward the protruding wall 30 when the stopper 28 swells by absorbing fuel and becomes softer. However, owing to the configuration as above, the stopper 28 remains in the blocking state and the extending portion 54 may be pushed back to the holding portion 26.

A fabrication process to mount the arm 50 to the insulator 20 will now be described briefly.

Firstly, the arm 50 is set. More specifically, the insertion portion 52 is aligned with the insertion hole 24 and the extending portion 54 is disposed so as to overlap the stopper 28 provided between the holding portion 26 and the protruding wall 30 in the insertion direction ID (see alternate long and two short dashes line of FIG. 3) at a position displaced from the holding portion 26 in the circumferential direction of the insertion hole 24.

Figure 6:
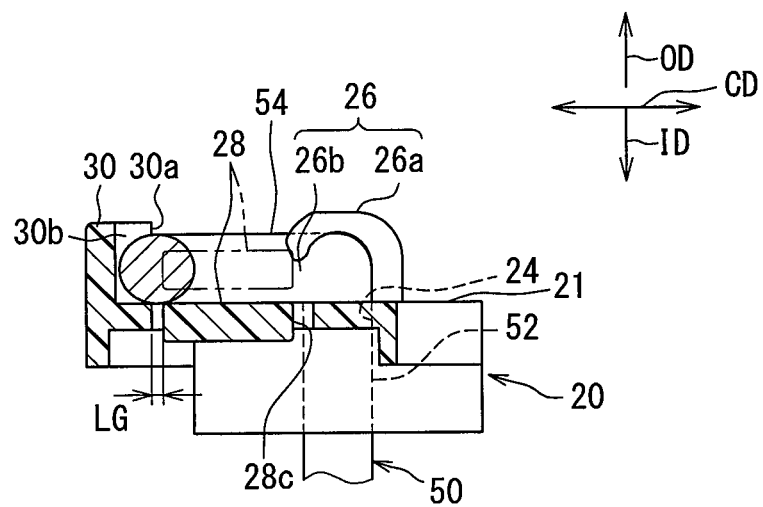
FIG. 6 is a view corresponding to FIG. 5 and used to describe a release state.

Subsequently, the insertion portion 52 of the arm 50 is inserted into the insertion hole 24 of the insulator 20 in the insertion direction ID. More specifically, as is shown in FIG. 6, the insertion portion 52 is inserted into the insertion hole 24 by moving the arm 50 disposed as above in the insertion direction ID. Because the extending portion 54 hits the stopper 28 while moving in the insertion direction ID, the stopper 28 undergoes elastic deformation and consequently moves in the insertion direction ID. That is to say, the stopper 28 changes to a release state to release the receiving opening 26b when the blocking portion 28c moves in the insertion direction ID.

A clearance is formed at least between the extending portion 54 and the holding portion 26 or between the extending portion 54 and the protruding wall 30 in a state where the insertion portion 52 is inserted into the insertion hole 24 and the extending portion 54 is disposed between the holding portion 26 and the protruding wall 30 (see also an alternate long and two dashes line of FIG. 3). In a case where the protruding wall 30 is not provided with the inclined wall surface 30b and the opposing wall surface 30a extends straightforward, it becomes difficult to form the clearance and it also becomes difficult to dispose the extending portion 54 between the holding portion 26 and the protruding wall 30. In another case where the protruding wall 30 is made shorter by removing a portion corresponding to the inclined wall surface 30b so as to avoid interference between the extending portion 54 and the protruding wall 30, strength of the protruding wall 30 decreases.

Subsequently, the extending portion 54 is inserted into the holding portion 26 through the receiving opening 26b. More specifically, the extending portion 54 is rotated toward the receiving opening 26b about the insertion hole 24 as a shaft and pushed into the receiving opening 26b.

Consequently, the holding claws 26a as the holding portion 26 undergo elastic deformation and the extending portion 54 is received by the holding portion 26 as is shown in FIG. 5. The stopper 28 moves in the opposite direction OD by elastically restoring again to the blocking state in which the blocking portion 28c blocks the receiving opening 26b. In the manner as above, the arm 50 is mounted to the insulator 20.

The following will describe an operational-effect of the present embodiment described above.

According to the present embodiment, when the arm 50 is inserted into the insertion hole 24 in the insertion direction ID to mount the arm 50, the extending portion 54 is moved in the insertion direction ID and disposed between the holding portion 26 and the protruding wall 30 to be pressed against the end face 28b of the stopper 28. The receiving opening 26b is released by allowing the stopper 28 to undergo elastic deformation in the insertion direction ID in the manner as above, and the arm 50 can be readily mounted by rotating the extending portion 54 toward the receiving opening 26b about the insertion hole 24 as the shaft. Eventually, the stopper 28 elastically restores to the blocking state and blocks the receiving opening 26b.

In a case where the extending portion 54 nearly comes off the holding portion 26 due to various factors, such as an external force, the stopper 28 blocking the receiving opening 26b prevents the extending portion 54 from coming off. When a large force is applied to the stopper 28 from the extending portion 54, the stopper 28 deforms to an opposite side to the receiving opening 26b. However, because the protruding wall 30 provided on the opposite side to the holding portion 26 protrudes in the opposite direction OD to the insertion direction ID beyond the end face 28b in the blocking state, the stopper 28 is prevented from surmounting the protruding wall 30 and the protruding wall 30 receives the stopper 28. Hence, the extending portion 54 can be held intact. According to the configuration as above, the liquid level detection device 100 which makes the arm 50 easy to mount and has a higher arm holding strength at a same time can be provided.

According to the present embodiment, a clearance is formed at least between the extending portion 54 and the holding portion 26 or between the extending portion 54 and the protruding wall 30 in a state where the insertion portion 52 is inserted into the insertion hole 24 and the extending portion 54 is disposed between the holding portion 26 and the protruding wall 30. Owing to the configuration as above, when the insertion portion 52 is inserted into the insertion hole 24 in the insertion direction ID to mount the arm 50, an unwanted event that the protruding wall 30 interferes with movement of the extending portion 54 in the insertion direction ID can be avoided. Consequently, the arm 50 can be mounted smoothly.

According to the present embodiment, a clearance is formed between the stopper 28 and the protruding wall 30. Hence, when the stopper 28 moves in the insertion direction ID, the stopper 28 is prevented from being hooked by the protruding wall 30. Consequently, the arm 50 can be mounted smoothly.

According to the present embodiment, the protruding wall 30 has the inclined wall surface 30b which becomes more distant from the extending portion 54 received by the receiving opening 26b with an increasing distance from the insertion hole 24. Owing to the configuration as above, when the insertion portion 52 is inserted into the insertion hole 24 in the insertion direction ID to mount the arm 50, an unwanted event that the protruding wall 30 interferes with movement of the extending portion 54 in the insertion direction ID can be readily avoided.

(Other Embodiment)

The present disclosure is not limited to the embodiment mentioned above, and can be applied to various embodiments which are also within the spirit and scope of the present disclosure.

More specifically, in a first modification, the protruding wall 30 may not have the inclined wall surface 30b which becomes more distant from the extending portion 54 received by the receiving opening 26b with an increasing distance from the insertion hole 24.

In a second modification, a clearance may not be formed between the stopper 28 and the protruding wall 30 and the stopper 28 and the protruding wall 30 may be in contact with each other. Meanwhile, a dimension LG of a clearance between the stopper 28 and the protruding wall 30 may be greater than a radius RA of the extending portion 54.

In a third modification, a clearance may be formed neither between the extending portion 54 and the holding portion 26 nor between the extending portion 54 and the protruding wall 30 and the extending portion 54 and the holding portion 26 may be in contact with each other and the extending portion 54 and the protruding wall 30 may be in contact with each other in a state where the insertion portion 52 is inserted into the insertion hole 24 and the extending portion 54 is disposed between the holding portion 26 and the protruding wall 30. For example, by allowing holding claws 26a as the holding portion 26 to undergo elastic deformation slightly, the arm 50 can be mounted even when no clearance is formed.

In a fourth modification, the variable resistor 60 functioning as a detection mechanism may adopt various other methods. For example, only one sliding contact point 64c may be provided.

In a fifth modification, a detection mechanism may adopt a mechanism which detects a magnetic field generated from a magnet held by a magnet holder as a rotating body using a hall IC held by a body as a fixed body.

In a sixth modification, the present disclosure may be applied to a liquid level detection device in a container equipped to a vehicle for other liquids, such as brake fluid, engine coolant, and engine oil. Further, containers are not limited to containers equipped to a vehicle and the present disclosure is also applicable to a liquid level detection device set in a liquid container equipped to various consumer devices and various transportation devices.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid level detection device provided with a fixed body fixed to a container and a rotating body rotating relative to the fixed body, and detecting a liquid level of a liquid stored in the container using a relative angle of the rotating body relative to the fixed body, comprising:

a float floating in the liquid; and an arm connecting the rotating body and the float and allowing the rotating body to rotate with up and down motions of the float, wherein the arm has an insertion portion to be inserted into the rotating body and an extending portion extending straight and bent relative to the insertion portion, and the rotating body has an insertion hole in which the insertion portion of the arm is inserted in an insertion direction, a holding portion having a receiving opening receiving the extending portion in an intersecting direction intersecting with the insertion direction and holding the extending portion received by the receiving opening, a stopper having an end face facing an opposite direction to the insertion direction and releasing the receiving opening by moving in the insertion direction due to elastic deformation from a blocking state in which the end face blocks the receiving opening, and a protruding wall disposed on an opposite side to the holding portion with the stopper in between and protruding in the opposite direction beyond the end face in the blocking state.

2. The liquid level detection device according to claim 1, wherein a clearance is formed at least between the extending portion and the holding portion or between the extending portion and the protruding wall in a state where the insertion portion is inserted into the insertion hole and the extending portion is disposed between the holding portion and the protruding wall.

3. The liquid level detection device according to claim 1, wherein a clearance is formed between the stopper and the protruding wall.

4. The liquid level detection device according to claim 1, wherein the protruding wall has an inclined wall surface which becomes more distant from the extending portion received by the receiving opening with an increasing distance from the insertion hole.

\* \* \* \* \*